(No Model.) 2 Sheets—Sheet 1.
M. W. LONG.
ELECTRIC MOTOR.
No. 358,682. Patented Mar. 1, 1887.
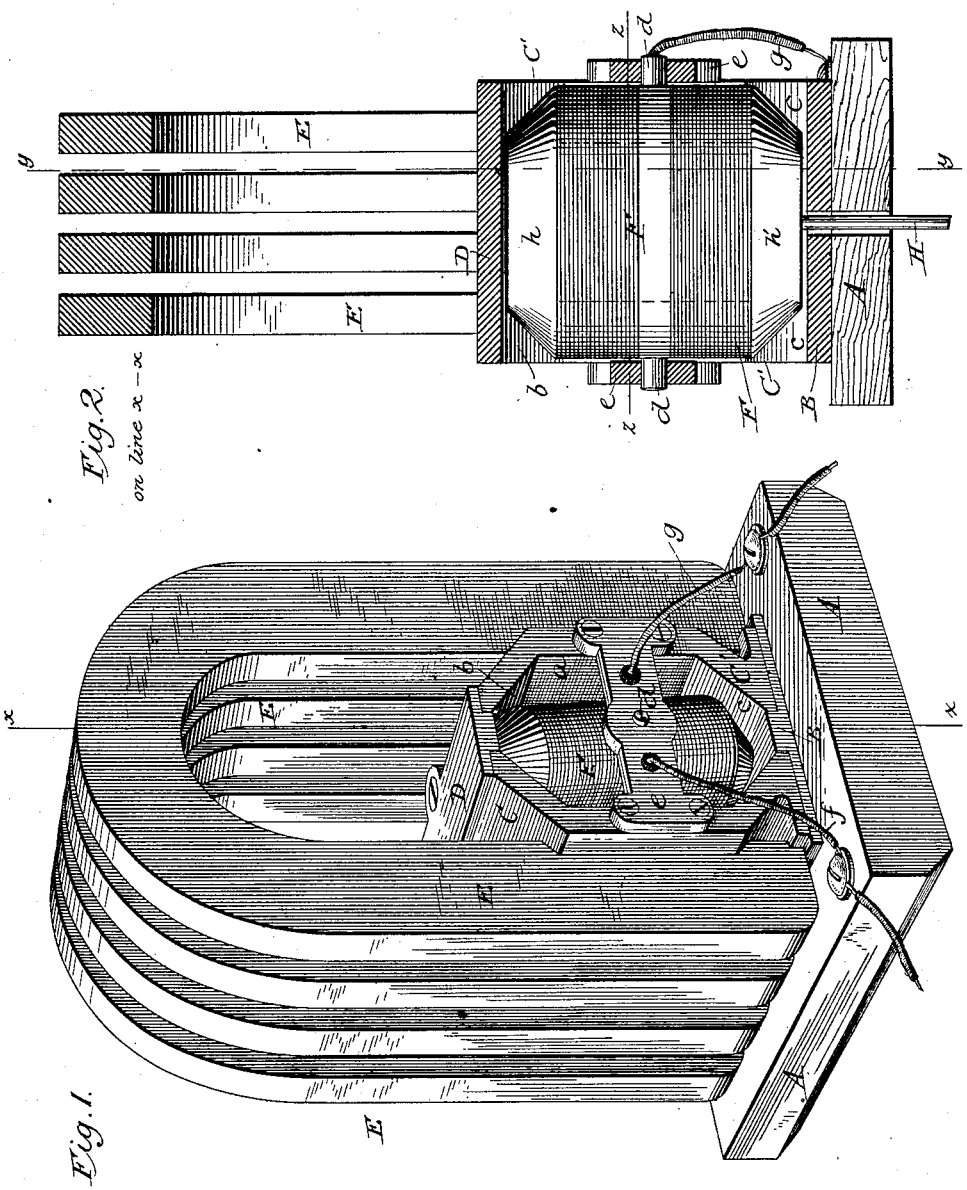
Attest.
Sidney P. Hollingsworth
Wm R Kennedy
Inventor.
M. W. Long
By his Atty
P. T. Dodge

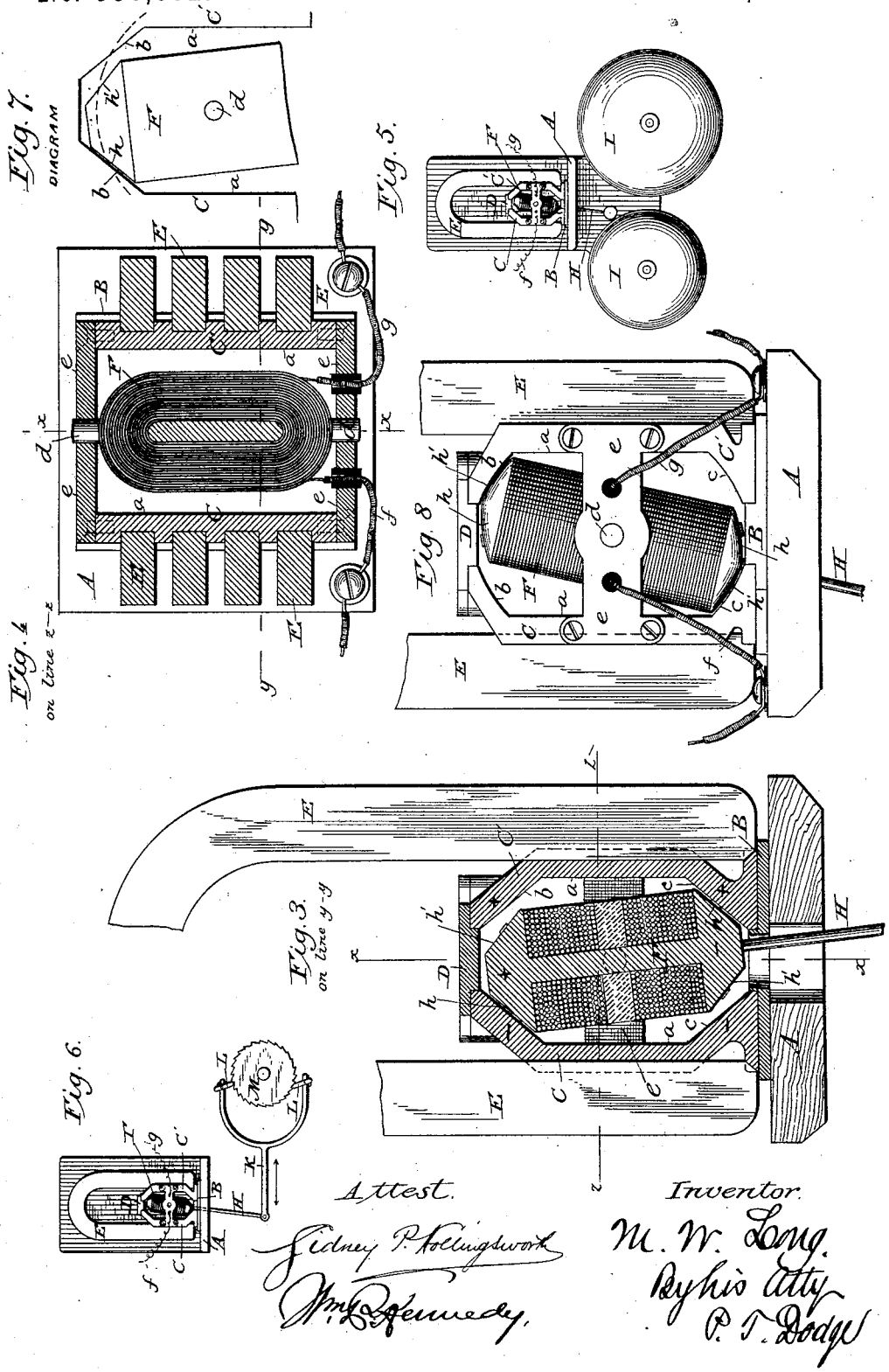

UNITED STATES PATENT OFFICE.

MALCOLM WALLACE LONG, OF HARRISBURG, PENNSYLVANIA.

ELECTRIC MOTOR.

SPECIFICATION forming part of Letters Patent No. 358,682, dated March 1, 1887.

Application filed June 1, 1886. Renewed February 3, 1887. Serial No. 226,476. (No model.)

*To all whom it may concern:*

Be it known that I, MALCOLM WALLACE LONG, of Harrisburg, in the county of Dauphin, and State of Pennsylvania, have invented certain Improvements in Electric Motors, of which the following is a specification.

This invention relates to that class of electric motors for operating railway-signals and for other purposes, in which a pivoted electro-magnet is caused by alternations in its exciting-current to vibrate between polarized armatures.

The particular aim of the invention is to utilize more fully the magnetic attraction and to avoid the liability of the vibratory member to stop "on the center," as frequently occurs in other motors of the vibratory type.

To this end it consists, mainly, in forming one or both poles of the magnet with faces beveled or rounded in opposite directions, in lines which intersect the path of movement, and in combining the magnet thus formed with polarized armatures or pole-pieces of permanent magnets having their faces in corresponding positions, so that the attractive force is exerted principally in substantially the direction of movement and the magnet and armature kept at all times in close proximity.

While I prefer to employ a magnet which vibrates, and have represented the same in the drawings, it will be readily understood that a vibrating armature of like form may be used in connection with a stationary electro-magnet.

In the accompanying drawings, Figure 1 is a perspective view of a motor embodying my invention of a form adapted for the striking of a signal-bell and for similar purposes. Fig. 2 is a vertical section of the same on the line *x x*, the armature being shown in side elevation. Fig. 3 is a vertical cross-section on the line *y y* of Fig. 2. Fig. 4 is a horizontal section on the line *z z* of Figs. 2 and 3. Fig. 5 is an outline elevation showing a striker and bells combined with the motor. Fig. 6 is an outline elevation showing the motor combined with a clutch mechanism for imparting a rotary motion to the shaft. Fig. 7 is a diagram illustrating the position of the faces of the magnet and the armature or pole-pieces with reference to the path described by the magnet in its movement. Fig. 8 is an elevation showing the magnet and pole-pieces with their opposing faces of a slightly-rounded form, instead of the flat form shown in the preceding figures.

In constructing a motor of the form shown in the drawings I provide a bed-plate, A, of non-conducting material, and secure thereon a non-magnetic base-plate, B, adapted to receive and sustain the lower ends of two soft-iron pole-pieces or armatures, C C', which are secured firmly thereto. The upper ends of these pole-pieces are connected securely to a non-magnetic cap-plate, D, by which they are held rigidly in position and at a proper distance from each other. Each of the pole-pieces presents on the inside a vertical face, *a*, and two inwardly-inclined faces, *b c*, at the upper and lower ends, respectively. In their outer faces the pole-pieces are provided with vertical grooves adapted to receive and retain the poles of the upright permanent magnets E. The parts are so proportioned that it is necessary to spring the arms of the magnets slightly apart in order to force them to their places in the pole-pieces, this construction being advantageous in that it avoids the necessity for fastening devices and secures an intimate contact between the magnets and the pole-pieces.

Loosely between the pole-pieces C C', I mount the vibratory electro-magnet F, sustained at its two ends by horizontal pivots *d*, mounted in supporting-plates *e*, secured firmly to the pole-pieces, as shown in the several figures.

The electro-magnet may be of any approved type, presenting at its ends poles of opposite polarity; but I would recommend a construction similar to that of the common Siemens armature, consisting of a soft-metal core recessed longitudinally and wound in the direction of its axis with insulated wire, the terminals of which, *f* and *g*, are extended outward through insulators in one of the plates *e*, or other supports.

On reference to the several figures it will be seen that at each end the magnet F has its pole formed with two flat or substantially flat surfaces, *h h'*, beveled or inclined in opposite directions and in planes which intersect the circular path of movement. It will also be observed that the inner faces, *b* and *c*, of the pole-pieces are beveled or inclined in like manner, so that they stand parallel with and in close proximity to the respective faces of the magnet when the latter reaches the limit of its movement in either direction.

In practice I find that by arranging the surface of the magnet and the pole-pieces in the relations above described I secure a much more effective action of the parts and an increased economy in the application of the electric forces.

I am aware that a magnet has been arranged to revolve past an encircling series of armatures, and I am also aware that a magnet having the faces of its poles in substantially radial planes has been arranged to vibrate between armatures in corresponding positions; and I lay no claim to either of said arrangements, the essence of my invention residing in the formation of the magnet with its faces oblique to each other and to the path of movement.

In practice I prefer to arrange the faces $h\ h'$ at an angle of about ninety degrees to each other; but there may be a reasonable departure from this angle in either direction.

I propose to utilize the vibratory motion of the magnet F, by means of any suitable mechanism, for any purpose to which it is applicable.

In Fig. 5 I have represented a signal apparatus in which the magnet is provided with an arm or striker, H, arranged to vibrate between and act upon two gongs, I.

In Fig. 6 I have represented the arm H of the magnet attached to a yoke-bar, K, the two arms of which carry pawls L, which act in opposite directions on a ratchet-wheel, M, the whole constituting a well-known form of mechanism for converting reciprocating into rotary motion.

While I prefer to retain the details of construction herein shown, it is manifest that they may be modified in various respects to suit the particular use to which the motor is to be applied.

When my motor is in action, the movement of the magnet is caused by the attractive force and also by the repelling force at each end. The symbols on the drawings indicate the polarity of the parts when the current is flowing in one direction through the magnet-coil. When the current is reversed, the polarity of the electro-magnet will of course be reversed.

Having thus described my invention, what I claim is—

1. In an electric motor, the combination of two pole-pieces or armatures and an intermediate vibratory magnet, the magnet having its pole or poles formed with faces beveled in opposite directions and in lines oblique to the path of movement, and the pole-pieces having faces arranged in corresponding positions, substantially as and for the purpose described.

2. In an electric motor, the combination of the pole-pieces or armatures C C', each provided with beveled faces $b$ and $c$, as described, and the intermediate electro-magnet, F, pivoted midway of its length and provided with beveled faces $h\ h'$, as described and shown.

3. In an electric motor, the combination of the magnets E, the grooved pole-pieces C, having the inclined surfaces $b$ and $c$, the intermediate plates, B and D, of non-magnetic material, and the vibratory electro-magnet F.

4. The magnets, the grooved pole-plates, the cross-bars attached to the pole-plates, and the vibratory electro-magnet sustained by the cross-bars, said parts combined substantially as described.

In testimony whereof I hereunto set my hand, this 15th day of May, 1886, in the presence of two attesting witnesses.

MALCOLM WALLACE LONG.

Witnesses:
S. W. FLEMING,
GEO. W. PARSONS.